(No Model.)

H. G. REIST.
COMMUTATOR.

No. 526,742.    Patented Oct. 2, 1894.

WITNESSES.
A. F. Macdonald.
T. J. Johnston.

INVENTOR.
Henry G. Reist
by Geo. R. Blodgett.
Atty.

THE NORRIS PETERS CO., PHOTO-LITHO., WASHINGTON, D. C.

UNITED STATES PATENT OFFICE.

HENRY G. REIST, OF SCHENECTADY, NEW YORK, ASSIGNOR TO THE GENERAL ELECTRIC COMPANY, OF NEW YORK.

COMMUTATOR.

SPECIFICATION forming part of Letters Patent No. 526,742, dated October 2, 1894.

Application filed June 28, 1894. Serial No. 515,960. (No model.)

*To all whom it may concern:*

Be it known that I, HENRY G. REIST, a citizen of the United States, residing at Schenectady, county of Schenectady, and State of New York, have invented certain new and useful Improvements in Commutators, of which the following is a specification.

My invention relates to commutators for dynamo-electric machines; and has for its object to provide a means of securing the commutator segments in place, particularly adapted to the large and heavy commutators of the modern, direct-coupled dynamo-electric machine. In such machines the bars are necessarily large and heavy to carry the great current generated, and it is imperative to provide for their effective insulation and to hold them rigidly against displacement by centrifugal force. It has been customary to wedge such commutator segments into place in various ways or to hold them in place with binding wires of various kinds applied over the insulation on the ends of the bars; but these have not been satisfactory arrangements because the wires were apt to become loose or to stretch, permitting a motion of the commutator bars, which, although slight, was sufficient to wear the insulation and eventually to so far impair it as to short-circuit the bars. It is also difficult to secure them in place against centrifugal action by such means. Where the wedging action was employed, as where the ends of the bars were brought to an angle, the bar was held securely in place, but in tightening up the bolts used to draw the rings together, the insulation of the ends of the commutator segments was apt to be impaired by the friction of the end rings sliding over it to a seat. There was also danger of forcing the bars over the insulation interposed between the bases and the spider or other frame to which they were secured. All of these difficulties I avoid by my improved method of securing the parts in place, which is illustrated in the accompanying drawings, in which—

Figure 1:
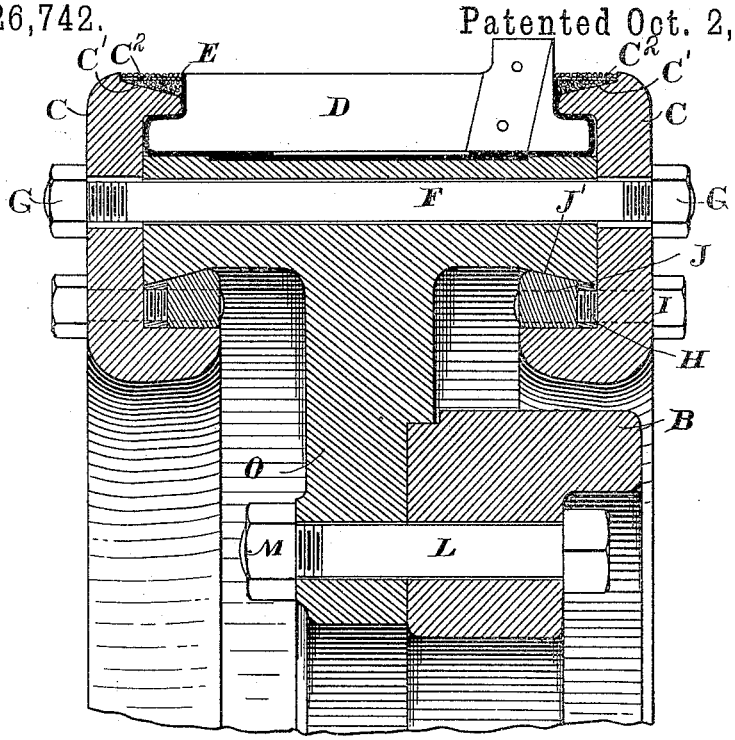
Figure 2:
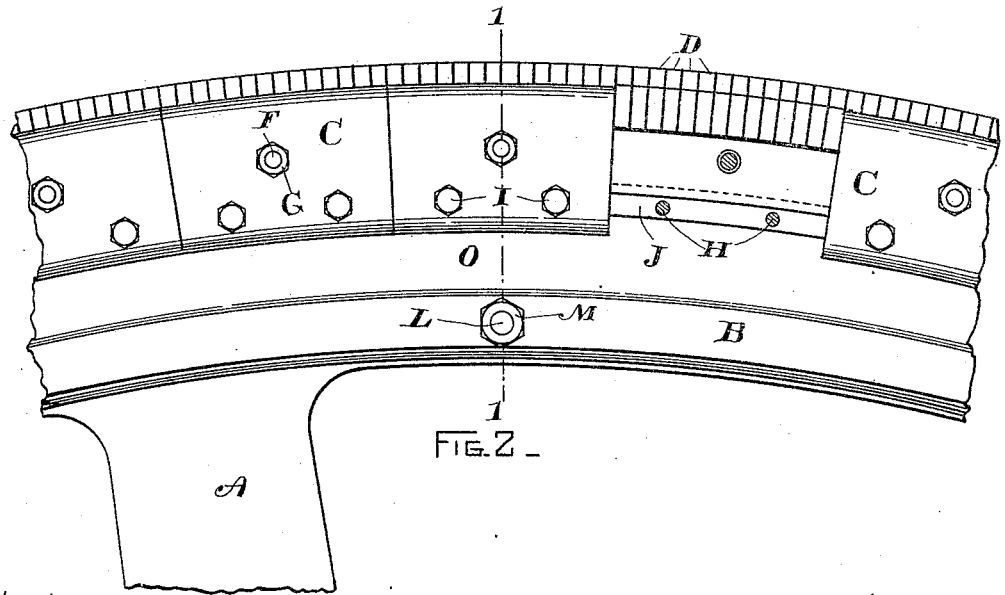

Figure 1 is a section upon the line 1—1 of Fig. 2, and Fig. 2 is a side elevation of my improved commutator having a part of one end ring removed to show the construction.

Referring to the drawings by letter, A is the arm of the pulley on which the commutator is carried.

B is a supporting ring forming a part of the pulley.

C, C, &c., are sections of the end ring used to clamp the segments in place.

D, D are the commutator segments or bars.

E is the insulation interposed between the segment and its support.

L shows one of the bolts used to clamp the supporting spider O to the pulley upon which the commutator is built up, M being the nut securing the bolt in place. This supporting part O of the spider is formed with dovetailed or beveled edges J' shown in Fig. 1.

The end rings C are formed with parallel inner faces, as shown best in Fig. 1, and these faces are at a right angle to the bottom of the groove in the back of the end ring section. A rectangular shouldered portion of the commutator segment is also formed parallel to its base so that one part of the end ring section fits directly over the shoulder, and its bottom fits directly against the supporting spider O. Between the other side of the groove in the end ring section and the beveled face upon the spider I insert a block J having one surface parallel with the center line of a bolt H and its other surface parallel with the beveled face upon the spider O. The construction is alike on both ends of the commutator, and to secure these end section rings firmly in place, I pass through from one to the other of them a bolt F having nuts G, G upon each end.

The method of assembling the parts is as follows: The commutator segments being put in place and properly insulated, the two end-ring sections, one on each end, embracing a suitable number of the segments, are put in place. The bolt F is passed through the registering holes in the sections within the spider O. The nuts G, G, are then tightened so as to bring the end-ring sections against the face of the spider somewhat firmly. The wedge-shaped nuts J are then inserted between the end-ring sections and the inner beveled face of the spider O, and the bolt head I being turned, the end-ring section C is forced toward the center of the commutator, thus drawing the commutator segments D firmly into place, and this, as will be seen from the construction, without friction upon the insulation E, the strain being limited only by the crushing strength of the insulation. The bolt F is then made tight.

As will be seen in Fig. 1, the outer face of the end-ring sections adjacent to the commutator segments is cut away at C', and these ends of the commutator segments are insulated from the end-rings at this point by wrapping twine, several layers in thickness. When the twine is wrapped around sufficiently to present an even surface, a sheet C² of leatheroid, or other tough insulating material, is interposed, and a further wrapping of the twine fills up the cavity to an even finish.

By the construction described, I get a firm engagement of the commutator bars with the spider supporting them, with an effective insulation, at the same time making it easy to remove the bars or a single one of them, if found necessary, to make repairs; and I obtain likewise a thorough insulation of the parts so as to diminish the risk of short-circuiting or other fault developing in the commutator.

What I claim as new, and desire to secure by Letters Patent of the United States, is—

1. In a commutator for a dynamo-electric machine, a supporting spider having inner beveled faces, a clamping ring and a beveled nut adapted to fit the space between the clamping ring and the inner beveled face of the spider, in combination with a commutator segment adapted to fit the opposite surface of the clamping ring, substantially as described.

2. In a commutator for a dynamo-electric machine, commutator segments having rectangular shouldered portions, end-rings having a rectangular groove in their inner surface, a spider having a beveled inner surface, and a bolt provided with a nut adapted to engage with the beveled inner surface of the spider and a rectangular groove in the end-ring, substantially as described.

3. In a commutator for a dynamo-electric machine, commutator segments having rectangular shouldered portions, a spider having an inner beveled face, end-rings having a rectangular groove, bolts adapted to hold the spider and the end-rings together, and clamping means consisting of a bolt and a wedging nut arranged to engage the inner beveled surface of the spider and a groove in the end-rings, substantially as described.

In witness whereof I have hereunto set my hand this 27th day of June, 1894.

HENRY G. REIST.

Witnesses:
B. B. HULL,
R. E. BRIZEE.